Patented Apr. 12, 1932

1,853,621

UNITED STATES PATENT OFFICE

COULTER W. JONES, OF McDADE, LOUISIANA, AND JOHN J. GREBE, OF MIDLAND, MICHIGAN, ASSIGNORS TO JONES CHEMICAL COMPANY, INCORPORATED, OF McDADE, LOUISIANA, A CORPORATION OF LOUISIANA

EXTRACTION OF IODINE

No Drawing. Application filed August 26, 1929. Serial No. 388,622.

The present invention relates to methods for the extraction of iodine from dilute aqueous solutions, mother liquors or natural brines wherein the element is present in combination chiefly as iodide.

In general the process consists in oxidizing or electrolyzing the iodide in the solution to form free iodine therein, then blowing such iodine out of the solution by means of air or similar inert gaseous current and finally absorbing the liberated iodine vapors in alkali hydroxide or carbonate solution or other suitable medium. We have found that it is essential for attaining a substantially complete extraction and recovery of the iodine content of the original brine or solution to establish and maintain therein a slightly acid condition previously to and particularly during the blowing-out operation. In an alkaline or neutral solution, or even in an acid solution having an insufficient degree of acidity, the iodine will not be completely liberated, or, if liberated initially, will be wholly or partially recombined in a form such that it cannot be blown out of solution. The result is that a portion, or even all, of the iodine may be fixed so that it is not directly recoverable by means of the present process unless the solution is subjected to further chemical treatment to release the iodine.

In practice the brines or solutions ordinarily available as a source of iodine contain exceedingly small amounts thereof in combined form; so small, indeed, in many instances as to escape detection except by the most delicate chemical tests. Nevertheless, we have been able to effect a substantially quantitative extraction of the iodine content of such brines or solutions, containing, for example, as little as 40 parts of iodine per million, by means of the general process hereinbefore referred to when a sufficiently close and accurate control was exercised upon the acidity of the solution during processing and without having recourse to the evaporation of large amounts of water in order to bring about a preliminary concentration of the solution. The invention, then, consists of the steps hereinafter fully described and particularly pointed out in the claims, the following description setting forth a preferred mode of procedure, such procedure, however, constituting but one of the various ways in which the principle of the invention may be used.

We have found that proper control of the acidity of the solution in which iodine is liberated depends upon accurate measurement and control of the hydrogen ion concentration thereof, rather than upon a simple acidity determination by titration with standard alkali solution. Unless the hydrogen ion concentration is maintained at or above a certain minimum value the iodine content in the brine or solution will not be completely liberated from chemical combination therein, the extent to which this occurs depending upon the deficiency in hydrogen ion concentration. Such fixed iodine will escape extraction in the succeeding step of the present process, thus involving a proportionate loss of iodine in the tail liquors or else necessitating additional treatment for the recovery thereof. In the case of a brine containing, as aforementioned, as little as 40 parts iodine per million, a relatively slight deficiency in hydrogen ion concentration may result in fixing all or nearly all of the iodine in a combined form that cannot be blown out of the solution.

To discuss briefly the relationship between acidity and hydrogen ion concentration, it is well known that a dilute aqueous solution of a strong mineral acid, e. g. hydrochloric, nitric or sulphuric acid, is almost completely ionized, so that for such solution the acidity and hydrogen ion concentration are practically equivalent and the terms are synonymous. A solution of a weak acid, however, e. g. $CO_2$, $SO_2$, acetic acid and organic acids in general, is only partially ionized, and in such solution the hydrogen ion concentration is represented by a value considerably less than corresponds to the total amount of acid actually present in the solution. Again, if a salt of a weak acid, e. g. sodium acetate, is present in a solution, and an equivalent amount of a strong acid is added thereto, the latter will displace the weak acid from its salt, the solution will acquire an acidity equivalent to that of the weak acid so formed and the hydrogen ion concentration will correspond to that of the weak acid liberated and not to that of the strong acid added. In the latter case, the salt of the weak acid is said to exert a "buffer" action whereby it neutralizes or absorbs a portion of the acidity of the strong acid. The presence of a similar buffer substance in a solution to which a strong mineral acid is added prevents the direct calculation of the hydrogen ion concentration of the resulting solution from the quantity of strong acid added, and such hydrogen ion concentration can be determined satisfactorily only by measurement according to one of the known physical methods, and not by a simple acidity titration with a standard alkali solution.

The usual symbol for expressing hydrogen ion concentration is pH accompanied by a numerical coefficient to indicate the degree of concentration. The value pH=0 indicates a normal hydrogen ion concentration, i. e., a solution containing 1 gram equivalent of hydrogen ions per liter; pH=1 indicates 0.1, i. e. $10^{-1}$, normality; pH=2 indicates 0.01 or $10^{-2}$ normality, etc., the numerical coefficient being a negative exponent which, therefore, increases as the concentration of hydrogen ions diminishes. The value pH=7 indicates exact neutrality, i. e., a solution containing a balance between H and OH ions corresponding to the ionization of pure water. Solutions having a pH less than 7 exhibit an acid reaction, and those having a pH greater than 7 have a basic reaction.

We have found that a pH=3 represents very closely the minimum hydrogen ion concentration required for completely liberating all of the iodine in elemental condition from a solution of the type herein referred to. At a lower hydrogen ion concentration, represented by a pH greater than pH=3, all or a portion of the iodine is held in combined form, but if the deficiency of acidity as represented by hydrogen ion concentration is made up by addition of sufficient mineral acid, such combined iodine may then be released in the free state. In the case of one natural brine containing approximately 40 to 50 parts of iodine per million we have found that at approximately pH=3.5 substantially all of the iodine was held in combination, but by acidifying the brine to bring the hydrogen ion concentration up to pH=3, the iodine could be completely released in elemental form.

From the foregoing it follows that operating a process of the present type without proper control of the acidity conditions may result in the loss of much, if not all, of the total iodine present in the original brine in case the acidity as represented by hydrogen ion concentration is too low. On the other hand, we have found that a slight excess of acidity, above the stated minimum value, e. g. up to pH=0 or thereabout, apparently facilitates the removal of iodine in the blowing-out stage. A still greater excess of acidity, while it may not adversely affect the extraction of the iodine, apparently affords no further advantage and, besides, involves a waste of acid which quickly assumes serious proportions as regards the renumerativeness of the process on account of the enormous volume of brine to be treated in relation to the actual quantity of iodine extracted therefrom. Under usual conditions, therefore, most satisfactory yields are realized when the hydrogen ion concentration is maintained approximately between the values pH=0 and pH=3. A somewhat higher pH value, e. g. pH=3.5, or even more, may be permissible under certain conditions due to economic or other considerations, but in such contingency a certain portion of the iodine will be held fixed and will escape extraction.

In the case of the natural brine containing 40 to 50 parts of iodine per million cited above, we have found that a greater quantity of acid must be added than the calculated amount required to make up the initial deficiency in hydrogen ion concentration in order to release all of the iodine from combination therein. This phenomenon is apparently accounted for by the presence of a "buffer" substance of the type already mentioned, the identity of which we have not yet ascertained. The existence of a "buffer" substance in a brine or solution to be treated in accordance with the present process, therefore, may prevent calculating in advance the exact quantity of acid to be added thereto for adjusting the hydrogen ion concentration to the desired value, at least if the identity of such substance is not known. By measuring the hydrogen ion concentration of the brine or solution, however, and adding acid until the desired pH value is reached, a direct and accurate means for the regulation of the treatment is afforded which possesses the degree of sensitiveness absolutely requisite when extremely small amounts of iodine are to be extracted. A suitable method for measuring hydrogen ion concentration, which we have employed with good results, consists in the use of an antimony-mercury-calomel electrode system sensitive to changes of H ion concentration in the acidified solution in connection with a recording potentiometer of standard make which also controls automatically the supply of acid.

The liberation of free iodine from the iodides present in the brine or solution may be carried out by any of the well-known methods of oxidation, employing either chemical or electrolytic means. As oxidizing agent, for example, manganese dioxide, ferric salts, chlorine, bromine or the like may be used. We have found a most convenient mode of procedure to consist, however, in electrolyzing the brine under controlled conditions of voltage, current, etc., just to the point where all of the iodine is liberated, but avoiding any excess of electrolysis which would liberate free chlorine or bromine from the corresponding salts thereof if also present in the brine.

As an illustration, we will describe the application of our improved process to a natural brine having the following approximate composition:

| | |
|---|---|
| Specific gravity | 1.036 |
| NaCl | 4.87% |
| MgCl$_2$ | 0.41% |
| CaCl$_2$ | 0.26% |
| Fe | 0.0088% |
| Br$_2$ | 0.0208% |
| I$_2$ | 0.0054% |
| Alkalinity approx | 0.012 N |

The above brine is received directly from the source supplying same at a temperature of approximately 120° F., the somewhat elevated temperature being advantageous for the subsequent processing of the brine, although not necessary therefor. The brine is acidified with sulphuric acid in amount just sufficient to neutralize the alkalinity, counteract the effect of the "buffer" substance already referred to and to produce a hydrogen ion concentration approximately between the limits expressed as pH=1 and pH=2. Such excess of acidity above the minimum value of pH=3 compensates for the alkalinity that otherwise would be produced in the following electrolysis step, holds the iron compounds present in solution and facilitates the separation of iodine in the later blowing-out operation. The actual quantity of acid to be added is not fixed, but may vary from time to time as the alkalinity and "buffer" reaction of the brine vary. The essential feature is to adjust the acidity to correspond closely to a prescribed pH value as found necessary for a substantially complete liberation and recovery of the iodine, such value, as aforesaid, being preferably between the limits pH=0 and pH=3. The acidified brine is then introduced into an electrolytic cell wherein it is exposed to the action of a direct electric current at a voltage of approximately 4 volts. The relative rates of flow of the brine and electric current are so adjusted that electrolysis takes place just to the extent required to liberate all of the iodine. Whether all of the iodine is liberated directly, or whether some chlorine or bromine is liberated at the same time and then reacts to free an equivalent amount of iodine, is immaterial, inasmuch as the result is the same in either case. The essential condition is that when the brine leaves the electrolytic cell substantially all of the iodine shall have been liberated therein, but no appreciable amount of free bromine or chlorine shall be present.

After undergoing such electrolysis, the brine is conducted to the top of a tower, preferably filled with packing material, into which it is introduced by means of spray nozzles or other distributing device. The brine containing the free iodine in solution or suspension therein descends the tower in a distributed flow against an opposing voluminous current of air. The air current "blows" the iodine out of the brine, such separated iodine being carried along in the exit gases leaving the top of the tower. The residual solution or tail liquor flowing from the base of the tower under properly regulated conditions is found to contain not more than 3 parts of iodine per million, or less. The iodine-laden air is then conducted to a suitable absorption or scrubber tower wherein it is passed either in parallel or countercurrent to a stream of an aqueous solution of an alkali metal hydroxide or carbonate whereby the iodine is absorbed and combined in accordance, for example, with the typical equation;

$$3I_2 + 6NaOH \rightarrow 5NaI + NaIO_3 + 3H_2O$$

From the resulting solution containing the iodide and iodate the iodine may be separated in any desired manner according to well-known methods.

Although we have described our improved process wherein the iodine is liberated from a suitably acidified solution by electrolysis, we may also employ any of the known chemical methods for the separation of the iodine, such as oxidation by means of manganese dioxide, a chlorate or a ferric salt in acid solution, or by means of chlorine or bromine, the acidity of the solution being adjusted, if required, to a value preferably between the limits expressed as pH=0 and pH=3. A somewhat greater acidity will not affect the completeness of the extraction of iodine, but it is unnecessary and superfluous and may involve a waste of acid, thereby adding to the cost of the extraction without providing any compensating return. Final adjustment of the acidity of the brine or solution to the preferred pH value may be made either before or after the oxidation or electrolysis of the solution, but should precede the blowing-out operation. Under usual circumstances, however, it will be most convenient to add the required amount of acid at one time before liberating the iodine, as set forth in the detailed procedure already described.

After having liberated the iodine from the properly acidified brine or solution, we prefer to extract the same by blowing out with a current of air or other inert gas in the manner described. However, we do not limit ourselves to such method of extraction. We may, if desired, employ any other suitable means for separating the liberated iodine from the accompanying brine or solution, as by extraction by means of an immiscible solvent, or by adsorption upon activated charcoal or other like material, or by other means adapted thereto. When another type of brine or mother liquor containing all or a portion of its iodine content in an oxidized condition, e. g. as iodate, is to be processed according to the present invention, such brine or mother liquor is first to be subjected to a preliminary treatment for the reduction of the oxidized compound either to free iodine or iodide, the further treatment thereof then being the same as already described.

In conclusion the principal advantages gained by means of our improved process are: (1) by accurate control of hydrogen ion concentration of the solution or brine being treated a substantially complete liberation of the iodine content thereof as free iodine is achieved; (2) no boiling of the brine or solution for effecting a preliminary concentration thereof or for the purpose of steaming out the liberated iodine, is required; (3) an economically profitable process is provided for the extraction from natural brines or mother liquors of relatively minute iodine values on the order of 40 to 50 parts of iodine per million or less. Although particular advantage attaches to the present process, as compared with other processes, when applied to the treatment of solutions having an extremely small iodine content, our improved process may be adapted also to the treatment of much stronger solutions or, in fact, solutions of iodine compounds in substantially any degree of concentration or dilution.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. A process of extracting iodine from a brine or solution containing the same substantially in the form of iodide which comprises acidifying such solution, electrolyzing to liberate iodine therein and separating such liberated iodine from the residual solution by blowing out with a current of air.

2. A process of extracting iodine from a brine or solution containing the same substantially in the form of iodide which comprises acidifying such solution to produce an acidity therein in excess of pH=3.5, electrolyzing to liberate iodine therein and separating such liberated iodine from the residual solution by blowing out with a current of air.

3. A process of extracting iodine from a brine or solution containing the same substantially in the form of iodide which comprises acidifying such solution to produce an acidity therein slightly in excess of $$pH=3.5,$$

electrolyzing to liberate iodine therein and separating such liberated iodine from the residual solution by blowing out with a current of air.

4. A process of extracting iodine from a solution containing the same in combined form as iodide which comprises producing therein an acidity in excess of the value expressed as pH=3.5, oxidizing to liberate iodine therefrom in the elemental state, and separating such liberated iodine by blowing out with a current of air.

5. A process of extracting iodine from a solution containing the same in combined form as iodide which comprises producing therein an acidity corresponding approximately to pH=3, electrolyzing to liberate iodine therefrom and separating such liberated iodine by blowing out with a current of air.

6. A process of extracting iodine from a solution containing the same substantially in the form of iodide which comprises establishing therein an acidity in excess of $$pH=3.5,$$

oxidizing to liberate iodine therefrom in the elemental state, separating such iodine by blowing out with a current of air and contacting the iodine-laden air with an aqueous alkaline solution to remove iodine therefrom.

7. A process of extracting iodine from a solution containing the same substantially in the form of iodide which comprises establishing therein an acidity in excess of $$pH=3.5,$$

electrolyzing to liberate iodine therefrom in the elemental state, separating such iodine by blowing out with a current of air and contacting the iodine-laden air with an aqueous alkaline solution to remove iodine therefrom.

Signed by me this 20th day of August, 1929.

COULTER W. JONES.

Signed by me this 22nd day of August, 1929.

JOHN J. GREBE.

Certificate of Correction

Patent No. 1,853,621.                                                            Granted April 12, 1932, to

COULTER W. JONES ET AL.

It is hereby certified that error appears in the printed specification of the above-numbered patent requiring correction as follows: Page 2, lines 73 and 74, strike out the words and comma " e. g. up to pH=0 or thereabout,"; same page, lines 87 and 88, strike out the words " between the values pH=0 and" and insert the word *at*; page 3, lines 55 and 56, strike out the words " between the limits pH=0 and "; same page, lines 113 to 114, strike out the words " between the limits expressed as pH=0 and " and insert the word *about*; page 3, line 130 and page 4, lines 1 to 12 inclusive, strike out the words " After having liberated the iodine from the properly acidified brine or solution, we prefer to extract the same by blowing out with a current of air or other inert gas in the manner described. However, we do not limit ourselves to such method of extraction. We may, if desired, employ any other suitable means for separating the liberated iodine from the accompanying brine or solution, as by extraction by means of an immiscible solvent, or by adsorption upon the activated charcoal or other like material, or by other means adapted thereto."; and that the said Letters Patent should be read with these corrections therein that the same may conform to the record of the case in the Patent Office.

Signed and sealed this 14th day of June, A. D. 1932.

[SEAL.]                                                                            M. J. MOORE,
*Acting Commissioner of Patents.*